Nov. 29, 1932.  J. PIERRON  1,889,696

PROJECTOR

Filed June 27, 1931

INVENTOR
Jacques Pierron
BY
Andrew T. Dupont
his ATTORNEY

Patented Nov. 29, 1932

1,889,696

UNITED STATES PATENT OFFICE

JACQUES PIERRON, OF VAUX-SUR-SEINE, FRANCE

PROJECTOR

Application filed June 27, 1931, Serial No. 547,316, and in France July 30, 1930.

The present invention has for its object a projector in which the emitted pencil of rays is limited in height in such a manner that the visual rays (rays of light from an object to the eye) situated above the zone thus restricted, cannot penetrate into the interior of the projector. Automobile front lights equipped with my invention will permit not only the emission of a pencil of rays for the purpose of lighting the road ahead, but they will also prevent the dazzling effects common in lamps which are not provided with a projector of the type described hereinafter.

The present invention consists in arranging before the projector two right angle prisms placed side by side along their inclined surface, one of them comprising an extension in a parallelepiped form enclosed in an opaque sheath.

The invention consists also in the combination of such a system of prisms with a reflector having an ellipsoidal form, one of the focuses of which coincides with the luminous source and the other focus of which is in front of the projector and on the axis passing through the luminous source and forming a tangent to the upper part of the container forming the opaque sheath.

Another characteristic of the invention consists in the reflecting prism defined above with a second reflector of spherical form, the centre of which is the luminous source, the object being to send back on to the first reflector the luminous flux reflected by the said first reflector.

By way of example, the realization of a projector according to the invention, has been represented on the accompanying drawing wherein:—

Figure 1:
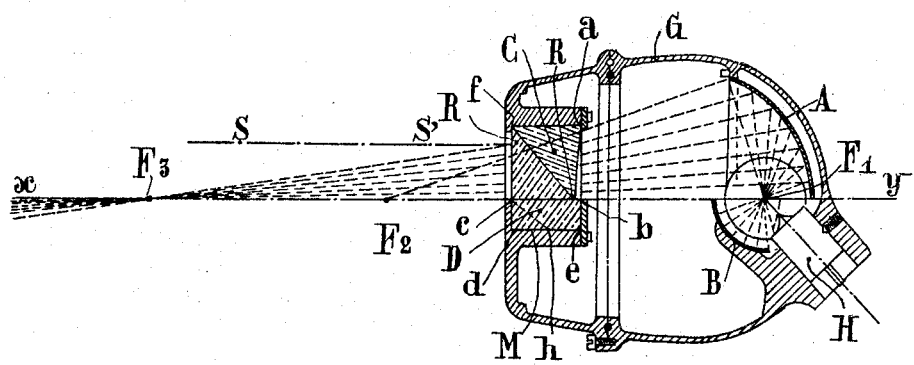
Figure 1 is a view in longitudinal section of the said projector.
Figure 2:
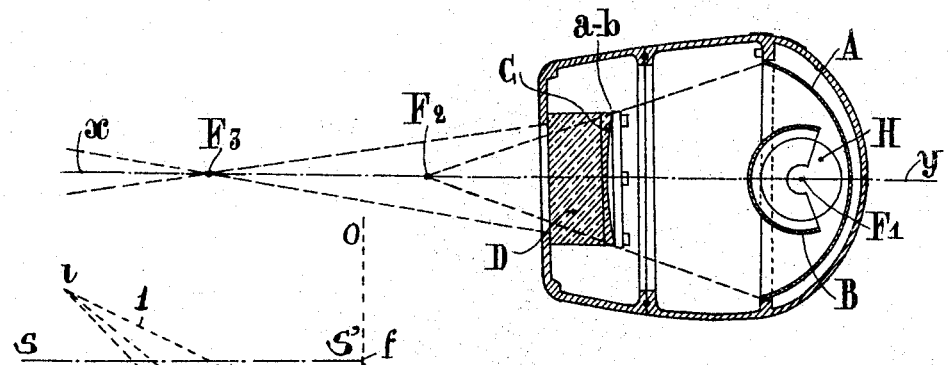
Figure 2 is a longitudinal section according to X—Y of Figure 1.

Upon referring to Figures 1 and 2, it will be seen that on a casing G, the lamp H, the reflectors A and B, and the prisms C and D are mounted.

The reflector A is in the form of a semi-ellipsoid whose axis $xy$ is the axis of the pencil of rays; the focuses of the ellipsoid are $F^1$ and $F^2$; the focus $F^1$ coincides with the filament of the lamp H.

The reflector B is in the form of a semi-sphere whose centre is at $F^1$.

The prisms C and D are arranged between the focuses $F^1$ and $F^2$.

The upper prism C is arranged in such a manner that its inclined face $fb$ coincides with the axis $xy$ at the angle R of the total reflection or an angle close thereto. The face $ab$ is either flat, cylindrical or lenticular according to the lighting effects desired. (In the construction described, the face $ab$ has been given a concave lenticular form so as to carry over the focus $F^2$ to $F^3$, which arrangement reduces the dispersion of the pencil of rays.)

The lower prism D is arranged in such a manner that its face $fb$ coincides with the axis $xy$ under the angle R of the total reflection or an angle close thereto; it is placed against the prism C along its hypotenuse surface. The prism D is extended in the form of a right parallelepiped $cbed$. The height $cd$ of the parallelepiped is such that in the right section $cbed$, an isosceles triangle $chb$ may be inscribed, the angles of which, at the base, are equal to the angle R of the total reflection. The parallelepiped portion $cbed$ is surrounded by an absorption sheath M.

It follows that if, in certain particular cases, it is considered unnecessary to entirely utilize the complete field of invisibility, the height of the parallelepiped may be diminished without the device thereby leaving the limits of the present invention. It is sufficient that the parallelepiped may always be present and that the dimension defined be that which insures the greatest field of invisibility.

The operation of the projector is the following:—

The rays received by the spherical reflector B reflected on to the focus $F^1$ strike the reflector A and combine with the rays received directly by this latter.

The ellipsoidal reflector A produces a semi-conical pencil of rays which converges on the focus F² and which may or may not be carried over to the focus F³.

The pencil meets the prisms C and D.

The upper prism C compensates exactly for the deviation and dispersion effects of the prism D.

Figure 3:
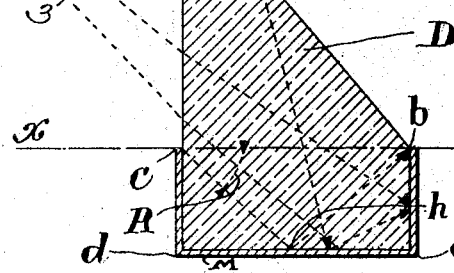
Figure 3 is a diagrammatical view of the prism with a parallelepiped base, in which it may be seen that the luminous rays situated above the limited zone as specified at the beginning of the specification, do not penetrate into the interior of the projector.

The lower prism D, due to its shape, constitutes an impenetrable screen for any visual ray emanating from any point whatever situated above the separation surface SS′ as indicated in Figure 3.

The visual rays emanating from any point such as $i$ situated above the separation surface SS′ either strike the surface $fb$ which reflects them on to the surface $de$ like the ray 1, or strike the surface $be$ directly like the ray 2, or strike the surface $de$ which reflects them on to the surface $be$ like the ray 3.

The most extreme ray, that is, the ray closest to $oc$ is reflected.

Indiscriminately, all the rays issued from the point $i$ must encounter the absorption sheath M. From the semi-conical form of the pencil, determined by the reflectors A and B, it results that:—

(a) the principal pencil of rays constituted by the cones of intense light issued from the filament traverses the prisms without absorption of light, the rays of this pencil forming a positive angle with the optical axis $xy$. The total reflection by the upper prism C is operative only upon the rays of the secondary pencil resulting from diverse inevitable imperfections;

(b) the pencil being concentrated upon a small space at the right of the prisms, use needs be made of only one pair of prisms of relatively restricted dimensions compatible with the use for which the projector is intended.

From the utilization of only one pair of prisms there results:—

(c) that the fault in construction or installation concerning either the angles, the edges, or the exterior surfaces of the prisms, have no appreciable effect upon the working of the device.

The precision of the device thus only depends upon the making of a true-plane glass face and may be obtained easily through means in current use in the industry.

(d) that it is possible to give the posterior surface $ab$ of the upper prism C a cylindrical form and above all a lenticular form suitable to regulate the pencil in width and depth without absorption of light of the principal pencil.

(e) that it is possible to prolong the lower prism D by means of a right angle parallelepiped $bcde$, sheathed and without absorption of light from the principal pencil.

From the parallelepiped prolongation $bcde$ of the lower prism D there results:

(f) that a perfect screen impenetrable to any visual ray emanating from any point such as $i$ situated above the separation surfaces SS′ tangential to the principal pencil and containing the axis $xy$ of this pencil, is constituted.

From the whole of the device described, it results that:—

(g) the projector emits a semi-conical pencil the widest and most luminous part of which lights the most distant objects.

(h) the projector is entirely invisible to any eye placed at any point whatever of the space situated above a separation surface tangential to the principal pencil and containing the axis of this pencil.

(i) this invisibility is obtained without absorption of light of the principal pencil.

(j) this invisibility is obtained even if the constituent parts are imperfectly constructed or assembled, and on the only condition that the hypotenuse surfaces of the prisms are flat.

What I claim and desire to secure by Letters Patent of the United States is:—

1. In a headlight, a casing, a source of light therein, and means in front of said casing to propagate the light and to prevent dazzling, said means comprising a pair of right angle prisms placed in juxtaposition along the inclined faces thereof, one of said prisms being provided with an extension of parallelepiped form, and an opaque sheath surrounding said extension.

2. In combination with the structure described in claim 1, a reflector of ellipsoidal form in the casing, having one focus coinciding with the source of light and the other focus being forward of said reflector and upon an axis passing through the source of light and being tangent to the upper portion of the opaque sheath.

3. In combination with the structure described in claim 1, a reflector of ellipsoidal form in the casing, having one focus coinciding with the source of light and the other focus being forward of said reflector and upon an axis passing through the source of light and being tangent to the upper portion of the opaque sheath, and a second reflector of spherical form whose center coincides with the said source of light.

In testimony whereof I affix my signature.

JACQUES PIERRON.